Dec. 6, 1949    J. A. McGREW    2,490,644
LOCOMOTIVE VALVE GEAR
Filed Feb. 28, 1944    5 Sheets-Sheet 1
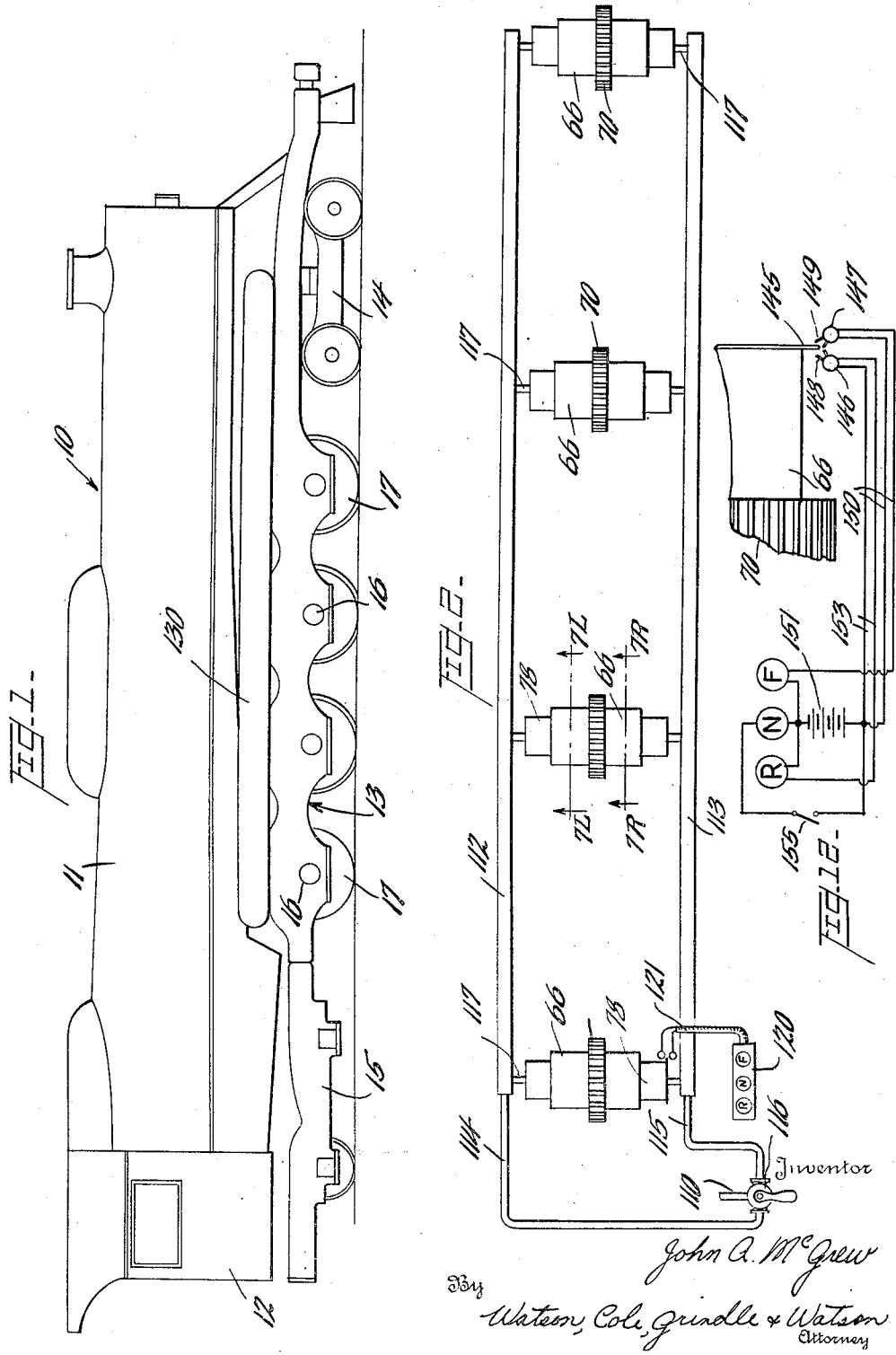

Dec. 6, 1949  J. A. McGREW  2,490,644
LOCOMOTIVE VALVE GEAR
Filed Feb. 28, 1944  5 Sheets-Sheet 2

Inventor
John A. McGrew
By Watson, Cole, Grindle & Watson
Attorney

Dec. 6, 1949  J. A. McGREW  2,490,644
LOCOMOTIVE VALVE GEAR
Filed Feb. 28, 1944  5 Sheets-Sheet 3
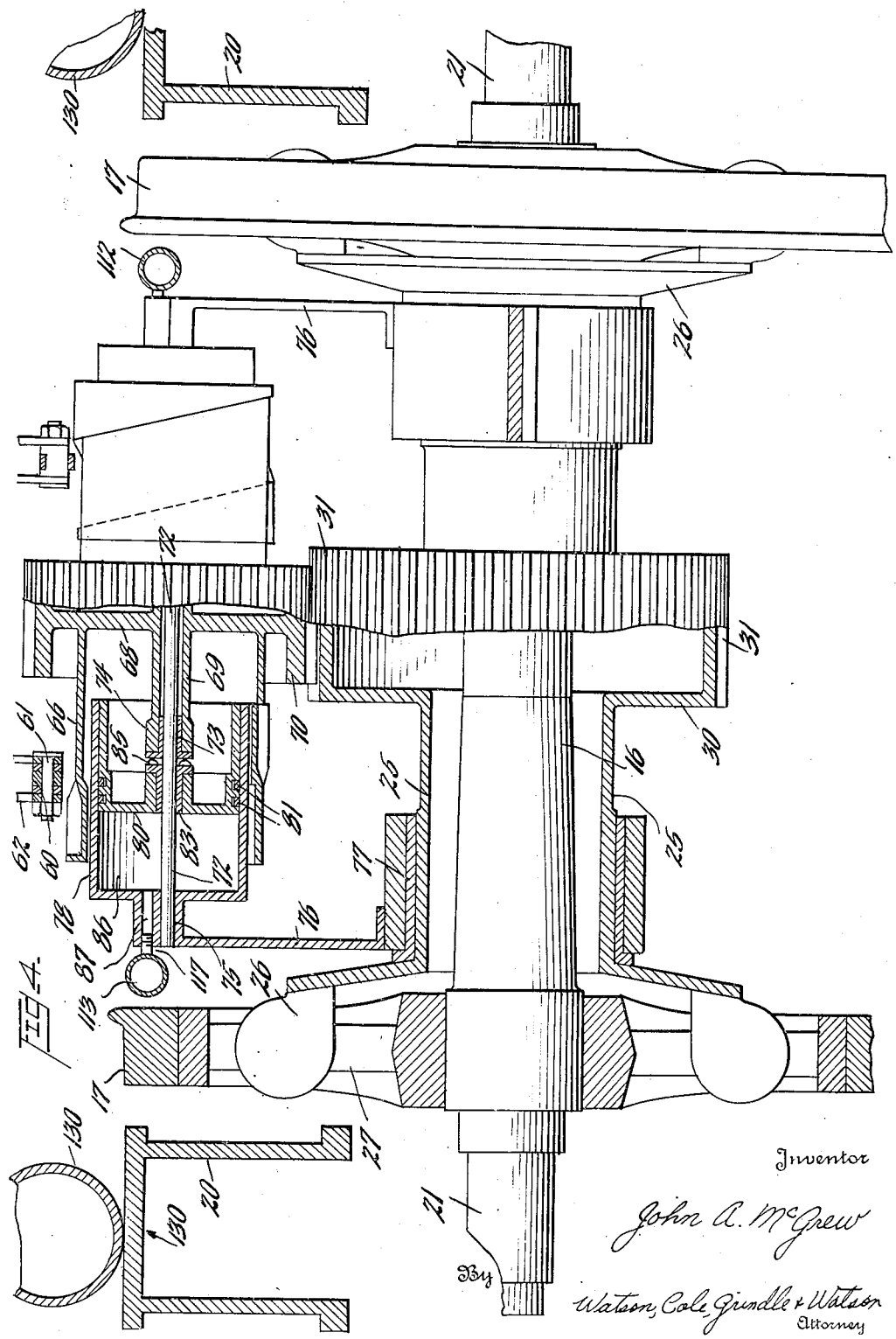
Inventor
John A. McGrew
By
Watson, Cole, Grindle & Watson
Attorney

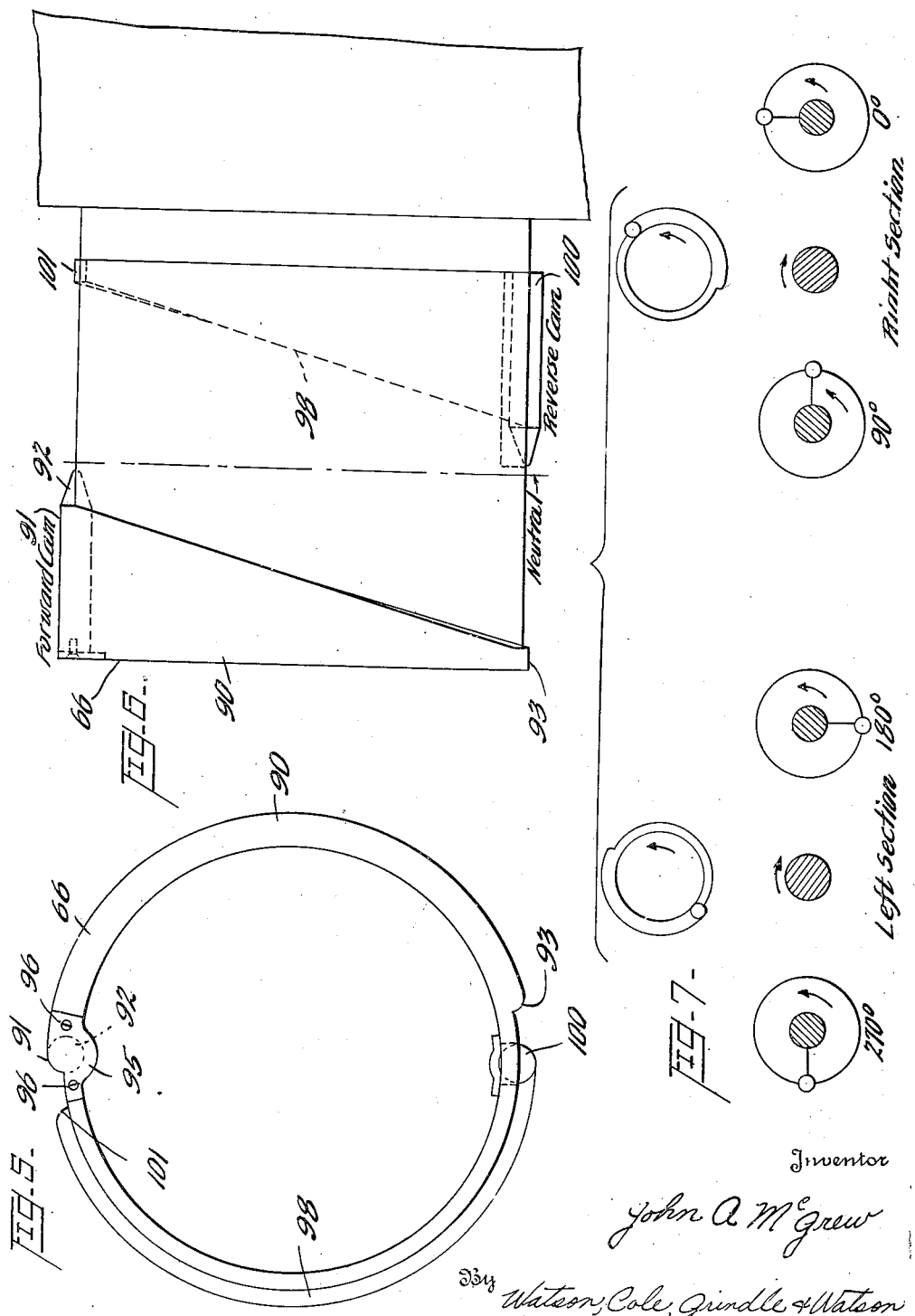

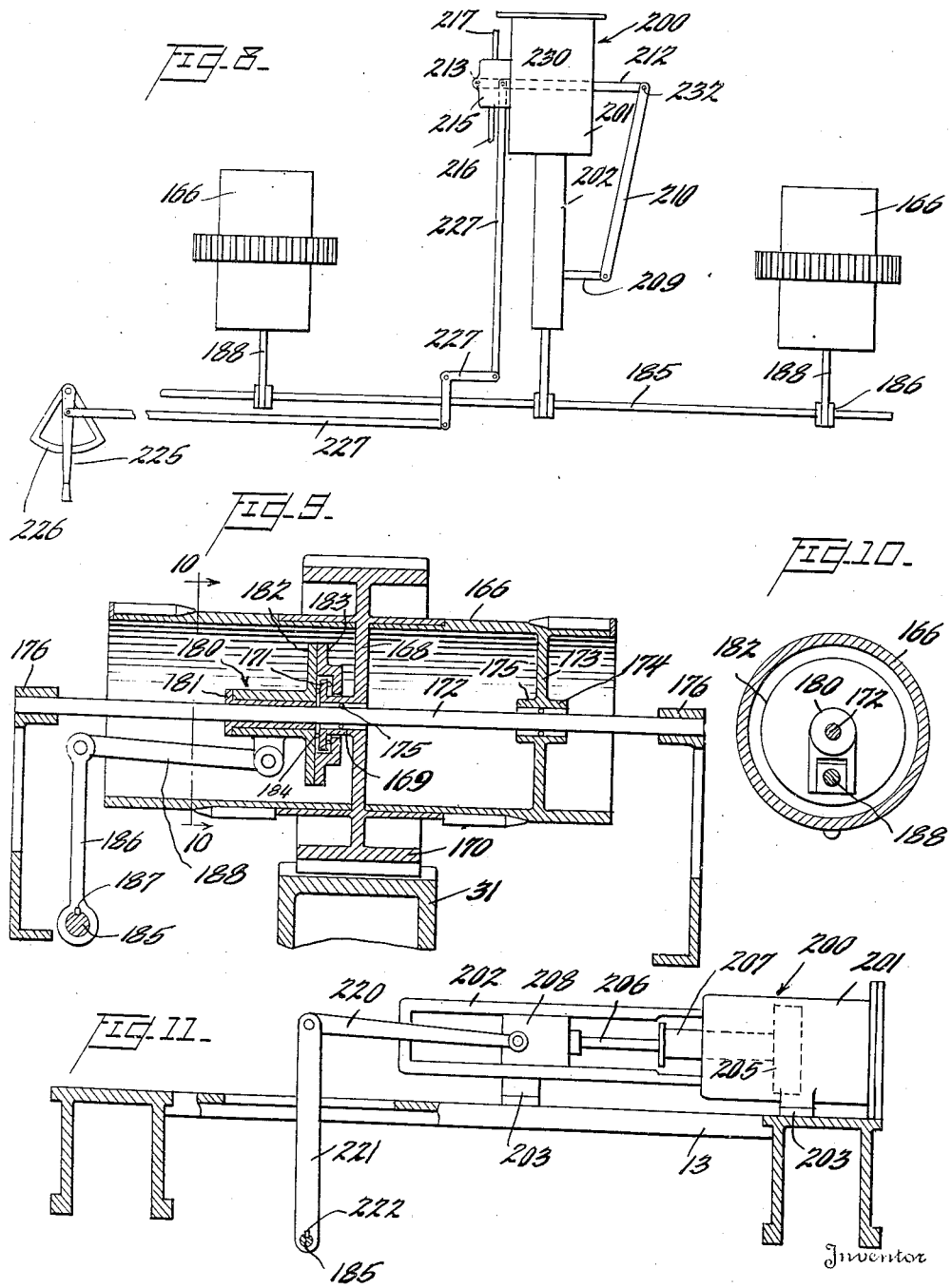

Patented Dec. 6, 1949

2,490,644

UNITED STATES PATENT OFFICE 2,490,644

LOCOMOTIVE VALVE GEAR

John A. McGrew, Albany, N. Y.

Application February 28, 1944, Serial No. 524,266

9 Claims. (Cl. 121—167)

This invention relates to railway locomotives, and more particularly to multiple engine, steam locomotives, of the general type exemplified by the disclosures in my United States Patents No. 2,214,424 and No. 2,289,203.

The general object of the invention is to provide an improved locomotive of the class described employing novel uniflow engines for motive power. These engines embody novel and advantageous features relating to valve construction and operation, including intake valve cutoff controls and provisions for prolonging the exhaust period by means of automatic pressure controlled poppet valves associated with the engine pistons. At the same time, there are retained all of the advantages of flexibility, economy and simplicity of operation, and reduction of dynamic augment due to unbalance, which inhere in the earlier inventions described in the patents to which reference has been made.

The present invention, in its preferred embodiments, contemplates the provision of separate steam engines applied to each driving axle, each engine comprising four vertically disposed uniflow cylinders, one disposed in each quadrant formed by the intersection of the longitudinal center line of the locomotive with the axis of the axle. Each cylinder is provided with an intake valve of the poppet type and all four of them are controlled as to neutral positioning, reversal, and changes in cut-off by means of a revolving, lifting cam drum which is shiftable laterally to attain the various settings of the valves to reverse the engine, vary the point of cut-off, or to dispose the valves in neutral position if a quicker stop is desired than would be obtained by the use of the main throttle. Preferably, fluid pressure means are provided for shifting the cam drum, and when a plurality of engines are simultaneously controlled, the operation is coordinated by the use of pressure equalizing cylinders or manifolds.

An alternative embodiment of the invention includes the provision of a servo motor and follow up mechanism for shifting the cam drums. The servo motor is connected with all of the drums by suitable cranks and linkages and it is arranged to accurately follow the movements of a manual controlling lever in the cab. A power reverse gear of conventional design may be conveniently utilized as the servo motor device when appropriately mounted upon the locomotive frame and connected with the cam drums of the engines.

The use of a cam drum of relatively large diameter instead of a slender cam shaft, makes possible longer valve travel and hence a quicker opening of the intake poppet valves.

Another advantageous feature involves the use of a renewable wear sustaining insert at the leading edges or lifting faces of the cam surfaces on the drum.

Other objects of the invention include the provision of means for lengthening and regulating the exhaust stroke of the non-condensing uniflow engine by the use of a poppet valve controlling an opening through the engine piston. An exhaust cavity is formed in each piston and this exhaust cavity has elongated ports opening outwardly toward the cylinder walls and adapted to register with the cylinder exhaust ports positioned intermediate the length of the cylinders as in all uniflow engines. The piston poppet valve is controlled by changes in cylinder pressure. The opening of the piston valve is effected by the reduced cylinder pressure caused by the uncovering of the usual uniflow exhaust openings. The opening of the poppet valve provides communication between the cylinder and the main exhaust ports which is maintained after the closing of the primary exhaust and up until the piston ports are in turn closed to the cylinder ports, at which time all exhaust ceases and the compression stroke begins. This lengthening of the exhaust period is desirable in view of the fact that the normal compression stroke is ninety percent and such high compression which this would give would require very high cylinder clearance (for example, from ten to seventeen percent), such as used in certain Russian and German uniflow engines.

Further objects and features of novelty will be apparent from the following specification when read in conection with the accompanying drawings in which one embodiment of the invention is illustrated by way of example.

In the drawings,

Figure 1 is an outline view in side elevation of a locomotive embodying the principles of the invention, much detail unnecessary to the disclosure of the present invention being omitted;

Figure 2 is a diagrammatic plan view of the fluid actuated engine control system comprising an important feature of the invention;

Figure 4 is a view in transverse vertical section through the truck of the locomotive, partly through the wheel centers and partly between the axles;

Figure 5 is a detail view in end elevation of one of the valve actuated cam drums;

Figure 6 is a fragmentary elevational view showing one half of one of the cam drums; and Figure 7 is a diagram indicating the preferred relative timing of the valves and the cranks of all four of the cylinders upon both sides of an axle.

Figure 8 is a diagrammatic partial plan view of a modified form of the invention, utilizing mechanical linkages and a servo device for adjusting the valve cam drums;

Figure 9 is a vertical transverse sectional view showing one of the cam drums adapted for actuation by the device shown in Figure 8;

Figure 10 is a vertical sectional view taken on line 10—10 of Figure 9;

Figure 11 is a transverse vertical sectional view through the frame of the locomotive showing the mounting of the servo motor device; and Figure 12 is a diagrammatic view showing one means for indicating to the engineman the positions of the valve control drums.

Figure 3:
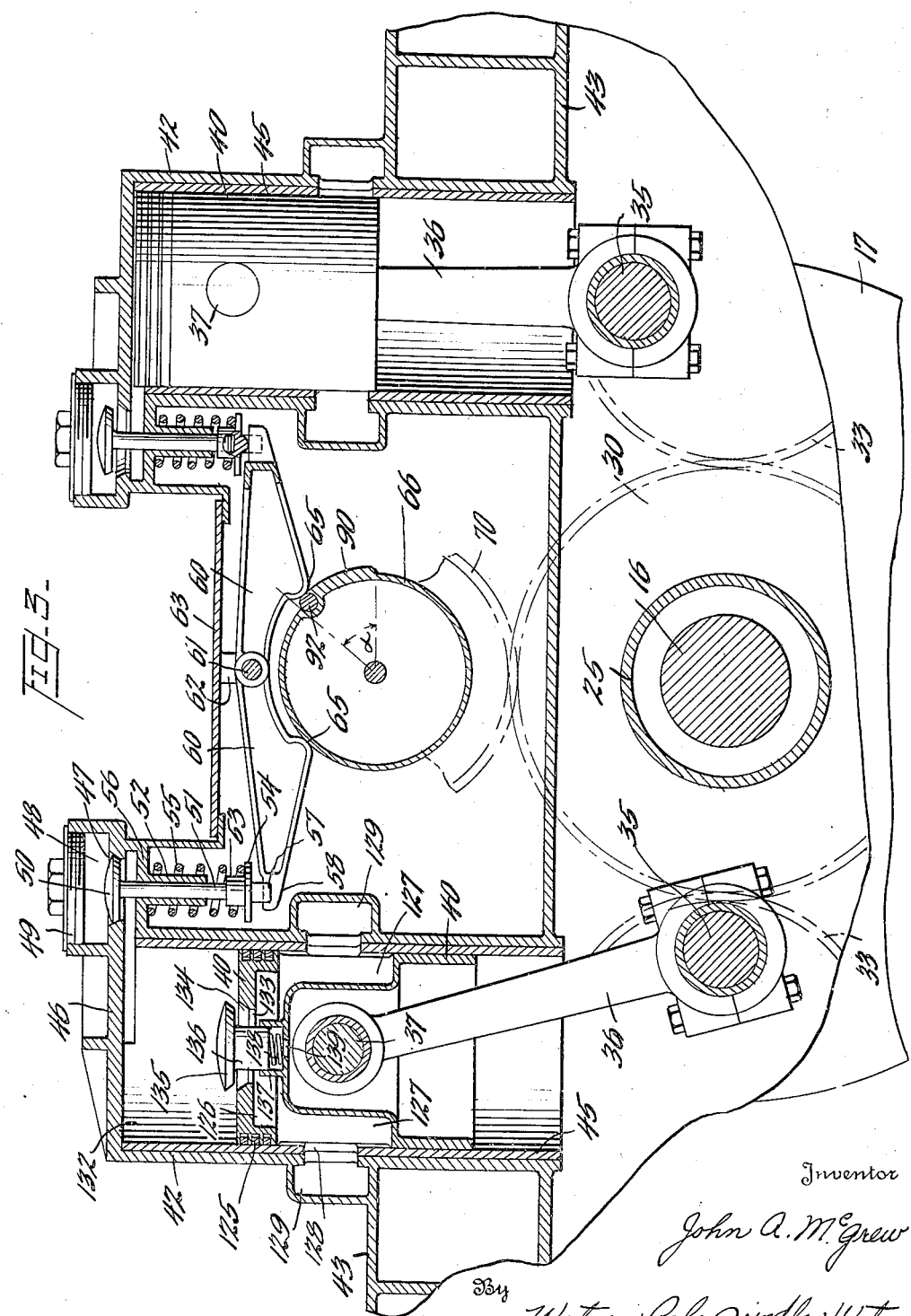
Figure 3 is a vertical sectional view of a portion of one of the sets of cylinders operatively connected to each driving axle of the locomotive, the section being taken substantially along the center line of the pair of cylinders on one side of the longitudinal center line of the locomotive.

In Figure 1 of the drawings, my improved locomotive is indicated generally by the reference numeral 10 and may comprise the forward boiler portion 11 and the rearwardly disposed cab 12, all being supported upon the main truck 13, the leading truck 14, and the trailing truck 15. In this particular instance, the main truck 13 is supported upon four driving axles 16, being parts of the wheel and axle assemblies shown somewhat more clearly in Figure 4 of the drawings and in considerably more detail in my earlier patents to which reference has been made. The driving wheels are designated by the reference numerals 17.

Referring now more particularly to Figures 3 and 4 of the drawings, it will be seen that the main truck 13 of the locomotive includes the hollow inverted U-shaped side frames 20 which are supported upon the bearing portions 21 of the axles 16 by suitable or conventional bearings which are not shown in the drawings.

The solid axles 16 are rigid with the wheels 17 and power is transmitted to the wheel and axle assemblies through a quill drive which comprises the hollow driving quill 25 which has radial extensions 26 which project between the spokes 27 of the wheels and are operatively connected with these spokes by springs which are not shown in the drawings, but may follow any conventional design of resilient quill drives.

The central portion of the driving quill 25 is enlarged to provide the hollow gear portion 30 upon which gear teeth 31 are formed. Meshing with this gear portion 30 are the driving gears 33 which comprise part of a crank drive, which drive includes the four crank members 35, to which are connected the lower ends of the connecting rods 36.

Each of the connecting rods 36 is pivotally connected at its upper end with a pin 37 carried by piston members 40. These pistons 40 reciprocate within the engine cylinders 42 which are disposed in pairs on each side of the transverse center line of the axles 16. The cylinders 14 are formed integrally with a casting 43 supported by or forming a part of the main truck 13. Each of the cylinders is provided with a liner 45.

The driving engines, of which the cylinders 42 form parts, are of the non-condensing uniflow type, having cam actuated intake valves in the cylinder heads and exhaust ports intermediate the lengths of the cylinders. The cylinder head casting 46 is provided with a valve seat 47 above which an intake chamber or passageway 48 is formed, these seats being closed by a threaded plug 49 which may be removed to provide access to the intake valve. The intake valve member comprises the head 50 and the stem 51 which is guided by the boss 52. The lower end of the valve stem 51 carries an enlarged portion 53, a flange 54 of which provides a seat for the coil spring 55, the upper end of said spring bearing against the web 56 of the cylinder casting. The lower end of the enlarged portion 53 is bifurcated at 57 so as to straddle the narrowed ends 58 to the rocking lever 60. Each of these levers is centrally pivoted upon the pintle 61 supported as at 62 from a top plate 63, forming part of the engine frame or assembly. Each of these valve actuating rocking levers 60 is also provided with a cam follower nose 65 which bears upon the periphery of the timing cam drum 66.

The timing drum 66 is rotated in synchronism with the main driving gear 30 and is also shiftable transversely of the locomotive to change the timing of the intake valves of the cylinders of the engine. The construction and arrangement of the valve timing drum 66 will be readily apparent from Figure 4 of the drawings. The drum is provided with a central circular web 68 and a central axial tubular portion 69. The web 68 is provided, peripherally, with annular flanges which form a gear or pinion 70, the teeth of which mesh with the teeth of the main driving gear 30.

The drum 66 is supported upon a pair of bearing bushings 73, each being provided within one of the enlarged ends 74 of the tubular axial portion 69. The outer ends of the axle 72 are supported within the openings 75 formed in the frame casting 76. This supporting frame is either secured to or forms a part of the engine casting or housing 43 and may rest upon the bearings 77 within which the quill 25 turns. Each of the frames 76 upon either side of the main gear 30 is provided with cylindrical inwardly projecting portions 78 which enter the open ends of the drum 66 but with some slight clearance. Fitted for reciprocation within the cylindrical portions 78 are the piston elements 80, the rings 81 insuring an airtight fit of the piston within the cylinder 78. The piston 80 is provided with a bushing 83 through which the axle 72 passes, the bushing 83 being adapted for sliding movement along the axle. Both the bushing 83 and the bushing 73 are provided with annular flanges between which anti-friction elements 85 may be interposed. It is understood that the pistons 80 are duplicated upon each side of the center line of the timing drum assembly and that a pressure fluid may be admitted to the spaces 86 within the cylindrical portion 78 and upon the faces of the pistons 80. A passageway 87 is provided to which a fluid manifold is connected.

The cam surface of one side of the timing drums 66 is shown in Figures 5 and 6 of the drawings. The raised cam surface 90 comprises the forward camming portion and extends from the wide leading edge 91 formed by the exposed surface of an inserted roller 92, to the narrow rear or trailing edge 93, which in this embodiment is slightly less than 180° from the forward edge. The substantially cylindrical opening in the drum 66 which is adapted to receive the roller 92 is closed for approximately 270° of its periphery and therefore is adapted to retain the roller 92 against removal transversely. The roller 92 is adapted to be inserted endwise and is retained in place by the removable cover plate 95 which may be secured in place by means of the fastening elements 96.

Another similar raised cam surface 98 is provided upon each half of the drum 66 and this surface is adapted to actuate the valves for reverse operation. The reverse cam surface 98 has a leading edge 100 and the narrowed trailing end 101, this cam surface being disposed generally upon the opposite side of the periphery of the drum from the forward cam.

It will be seen that the length and disposition of the leading edges of both of the cam surfaces 90 and 98 are such that there is a point centrally of each half portion of the drum 66 which contains no camming surface. This, of course, comprises a neutral position for the engines.

It will be readily understood how the noses 65 of several valve actuating levers 60 follow the surface of the drum and are contacted and moved by the camming areas. In Figure 3 of the drawings, one end of the drum 66 is shown in cross section taken at an intermediate point on the forward cam surface 90, the roller 92 having just contacted the nose 65 of the right hand lever 60 and raised it to valve opening position. At this particular adjustment of the cam drum 66, the cut-off for the valves is equal to the angle α, this angle in the illustrated example being approximately 50°. It will be readily understood that by shifting the drum 66 longitudinally of its axis, the proper length of the cam may be selected to give a desired cut-off for either forward or reverse operation.

As a means for controlling the adjustment of the timing drum 66, there may be provided a system such as is illustrated diagrammatically in Figure 2 of the drawings. In this example, compressed air is utilized as the control fluid and is supplied from any suitable source to the pipe 110. Two manifolds of rather large capacity are disposed along side of the control cylinders, the one upon the left hand side of the locomotive being designated 112 and the one on the right hand side 113. The pipes 114 and 115 respectively connect these manifolds with the valve 116. These manifolds are connected to the openings 87 leading to the control cylinders 78 at each end of the several drums 66, by means of the short nipples 117. The arrangement of the valve 116 and its connections is such that compressed air may be led into the manifolds 112 and 113 alternatively, the manifold upon one side being opened to the atmosphere as pressure fluid is admitted to the manifold on the opposite side. The manifolds are of ample capacity to provide immediate response and equalization of pressure on all of the drums.

Indicating means, shown diagrammatically at 120 in Figures 2 and 12, may be disposed in the cab and connected by any suitable means, indicated at 121 in Figure 2, with one or more of the control cylinders 78. Such a signal or indicator may be electrical or actuated by fluid pressure, and should show whether the control drum is at its central neutral position of adjustment or set for forward or reverse operation. If desired, the indicator could also show the amount of cut-off attained by each adjustment of the forward or reverse cams.

One novel form of position indicating means forming a part of the present invention is shown diagrammatically in Figure 12 of the drawings. The drum 66 is provided at one end with a projecting annular flange 145 which serves as a trip device for actuating the electric switches shown diagrammatically at 146 and 147 in Figure 12. These switches may be of any suitable or known type and are each provided with a pair of actuating arms 148 and 149, the arms of each pair being spaced apart and adapted to be contacted by the trip flange 145.

The arrangement of the switches and the actuating arms with relation to the trip flange will be readily understood from the drawings. In the position shown the drum is at neutral, and both the right hand and left hand switches are in off positions. Upon movement of the cam drum 66 to the right in Figure 12 the outer switch arm 149 will be contacted by the flange 145 and the switch 147 will be closed and through the circuits 150 and the source of current 151, the forward signal marked F will be energized. When the switch arms 149 are rotated in a clockwise direction by this movement of the flange 145 they will remain in such position until the flange 145 returns to neutral. Just before reaching the neutral position the left hand projection or arm of the pair 149 will be contacted and moved to the left or in a counterclockwise direction and the signal F will be deenergized. It will be noted that the neutral signal N is always on, except when it may be desired to turn it off by means of the manual switch 155, and it will be understood that when this signal is the only one energized, the drum is actually at the neutral point. When, however, either the forwarding or reverse signals are energized together with the neutral signal, it will be understood that the drum is in forward or reverse position as indicated.

Upon movement of the drum and flange 145 to the left, the left hand actuating arm of the pair 148 will be contacted and the switch 146 will be rocked to the left or in a counterclockwise direction to closed position, whereupon through the circuit 153, the signal R will be energized. Similarly upon return of the drum to neutral position, the flange 145 will contact the right hand element of the pair of actuators 148 and will rotate the switch 146 to open position, de-energizing the signal R and leaving the neutral signal showing alone.

Returning again to Figure 3 of the drawings, it will be seen that each of the pistons 49 are provided with suitable packing rings 125, and the pistons are also provided with internal chambers 126 having depending portions 127 upon each side of the piston. These laterally disposed chamber portions are open substantially throughout their vertical height upon their outer sides facing the walls of the cylinder and are adapted to communicate through the exhaust ports 128 with the exhaust chambers 129 which surround the cylinders 42. These exhaust chambers are suitably connected with the exhaust manifold 130 shown in Figure 1 of the drawings. The upper interior chamber 126 of the piston connects with the space 132 within the cylinder 42 above the piston 49, through an opening 133 having a valve seat 134 upon which the valve 135 is received during the expansion period. The valve 135 is a poppet valve having a cylindrical portion 136 guided within the hollow boss 137 of the piston casting and urged upwardly into open position by means of the coil spring 138. The opening 139 vents the space within the boss 137 beneath the valve portion 136.

It will be readily understood that the provision of this spring-opened and compression-closed poppet valve will serve to lengthen and regulate the exhaust stroke of the non-condensing uniflow engine described. The opening and closing of the piston poppet valve is controlled by the changes in cylinder pressure. The reduced cylinder pressure caused by the opening of the normal uniflow exhaust causes the piston valve to open. This provides a connection between the cylinder and the main exhaust ports which is maintained even after the closing of the primary exhaust orifices. Then when the piston ports constituted by the open passages 127, are in turn closed by non-registry with the cylinder ports, all exhaust is stopped and the compression stroke begins.

In Figure 7 there is shown very diagrammatically the timing relationship of the valve actuating drum and the cranks of the two cylinders upon each side of the center line of the locomotive. For the purpose of applying these diagrams more readily to the locomotive and its controls, section lines 7L—7L and 7R—7R are applied to Figure 2 of the drawings; and the left hand half of the diagram in Figure 7 represents diagrammatically the section taken on line 7L—7L and the right hand half shows the arrangement of the parts as taken on line 7R—7R. It will be readily seen that the crank positions of the four cylinders are separated by 90°, and the cranks on the same side of each axle are 180° apart. The relative position of the valve controlling cam drum is also indicated in this diagram. The right hand end of the drum is in valve-opening position for the forward right hand cylinder. The right hand rear cylinder intake valve is closed; the forward left hand cylinder is also closed; and the rear left hand cylinder valve is either closed or still open depending upon the length of cut-off to which the drum is adjusted.

In Figures 8-11 inclusive, there is illustrated an installation for actuating the cam drums to set the timing of the valves in a very efficient and positive manner, by the use of a servo motor device which may conveniently be adapted from a power reverse gear of familiar type. The cam drums 166 in this embodiment are of the same general nature as are the drums 66 of the pneumatically actuated embodiment and they are provided with the centrally disposed gear portions 170, which mesh with the teeth of the main gear 31, and is shiftable relatively to said main gear. The central web 168 of the drum is provided with a lateral tubular portion 169 which is provided with a radial flange 171. The drum is also provided with a web or spider 173 which has a hub 174. Suitable antifriction devices such as ball or roller bearings 175 are provided within the parts 169 and 174 whereby the drum 166 may both rotate and move longitudinally with respect to the supporting shaft 172 which is carried at its ends within the brackets 176.

A shiftable sliding member 180 is provided with a tubular bushing 181 and is adapted to slide upon the shaft 172. A radial flange 182 formed on the member 180 is secured face to face with a flanged cap 183, which is fitted around the tubular portion 169, 171 of the drum, so that the sliding member 180 embraces the flange 171 and will serve to shift the drum upon the shaft 172 when the member 180 is moved. Antifriction elements 184 are interposed between the flanges of the member 180 and the axially disposed parts of the drum to permit rotary movement of the drum with respect to the member 180.

An elongated rock shaft 185 is disposed along one side of the frame of the locomotive adjacent each drum of the multiple engines thereof. A crank 186 is keyed as at 187 to the shaft 185 adjacent each drum and is connected with the shiftable member 180 by means of the link 188, whereby upon rocking the shaft 185 in either direction from the positions shown in Figures 8, 9, and 11, the drums 166 will be shifted axially to bring the desired portions of the forward and reverse cams beneath the valve actuating followers, all described in connection with the earlier embodiment of the invention.

Indicated generally by the reference character 200 in Figures 8 and 11 of the drawings is a servo device which in this particular embodiment of the invention is a power reverse gear of a well known type. The reverse gear is shown in the drawings diagrammatically. The construction and operation will be clearly apparent to one skilled in the art to which this invention relates, and a mere detailed showing of a power reverse gear of this type is displayed in "Locomotive Cyclopedia," edition of 1941, page 620.

Essentially, the power reverse gear 200 comprises the air cylinder 201 and a cross head guiding frame 202, which are provided with pedestals or feet 203 which are rigidly connected with the frame 13 of the locomotive, the device 200 being disposed transversely to the center line of the locomotive. A piston 205 reciprocates within the cylinder 201 and the piston rod 206 extends from the cylinder through the stuffing box 207 and is rigidly connected with the sliding cross head 208. The cross head is provided with a laterally extending arm 209 which is connected by means of the link 210 with a valve actuating lever 212. The lever 212 is a floating lever which is connected at the pivot point 213 with a crank or other means for actuating the valve contained within the valve casing 215 and arranged to admit air to one end or the other of the cylinder 201 to move the piston in the desired direction. Air is admitted to the valve casing through the pipe 216 and is exhausted therefrom through the pipe 217. The cross head 208 is connected by means of the link 220 with the crank arm 221 which is keyed as at 222 to the rock shaft 185.

In the cab of the locomotive there is arranged a valve actuating lever or handle 225 which is adjustable along the quadrant 226 which may be graduated as desired. The lever 225 is connected by means of the linkage 227 with the point 230 on the flange actuating floating lever 212.

The actuation of this control means will be readily apparent. The device is shown in central or neutral position in Figure 8 of the drawings and the movement of the handle 225 in either direction will effect a corresponding movement of the lever 212 about the pivot point 232 as a center. This will shift the point 213 and open the valve to admit air upon the appropriate side of the piston 205. The piston and the cross head 208 will move in one direction or the other carrying with it the projection 209 which will shift the fulcrum or pivot point 232 of the floating lever 212 and restore the valve to central position after the device has moved a distance corresponding to the shift of the handle 225. This mechanism comprises the follow up arrangement for the servo motor 200. The crank 221 will, of course, have been swung to a corresponding extent of movement and the rock shaft 185 will have rotated to actuate all of the cam drums 166 the same distance.

Obviously the same cab indicator installation may be employed in connection with this embodiment as described in relation to the arrangement illustrated in Figures 2 and 4 of the drawings.

It is understood that various changes and modifications may be made in the embodiments illustrated and described herein without departing from the scope of the invention as defined by the subjoined claims.

Having thus described the invention, what is claimed as new and desired to be secured by Letters Patent is:

1. A prime mover comprising, in combination, a multicylinder uniflow steam engine mounted adjacent to and in driving relationship with a drive shaft, a poppet valve controlling the intake of each cylinder, opening means for said valves each including a cam follower, a hollow cam drum of relatively large diameter supported for rotary valve actuating movement and for axial timing adjustment movement relative to said followers, said drum having raised cam areas on the outer surface thereof adapted to actuate said followers at properly timed intervals, means for rotating said drum in synchronism with said drive shaft, a non-rotating, fluid pressure actuated, axially shiftable transmission member housed within said hollow drum and abutting a portion rigid with the drum for effecting said axial timing adjustment movement of the latter, and fluid pressure means for moving said transmission member at will.

2. The prime mover as set forth in claim 1 in which said cam drum is slidably and rotatably carried by a relatively fixed supporting shaft by means of a tubular axial stem forming part of the drum structure; in which said fluid pressure actuated means comprises a fixed fluid pressure cylinder received within the drum; in which said transmission means comprises a piston working in said cylinder, slidable on said supporting shaft, and adapted to bear axially against said stem; and in which anti-friction means is interposed between the stem and piston.

3. A prime mover comprising, in combination, a multicylinder uniflow steam engine mounted adjacent to and in driving relationship with a drive shaft, a poppet valve controlling the intake of each cylinder, opening means for said valves each including a cam follower, a hollow cam drum of relatively large diameter supported for rotary valve actuating movement and for axial timing adjustment movement relative to said followers, said drum having raised cam areas on the outer surface thereof adapted to actuate said followers at properly timed intervals, means for rotating said drum in synchronism with said drive shaft, a fluid pressure motor within said drum and connected thereto for effecting said axial timing adjustment movement of the drum, and actuating means for said motor.

4. A prime mover comprising, in combination, a multicylinder uniflow steam engine mounted adjacent to and in driving relationship with a drive shaft, a poppet valve controlling the intake of each cylinder, opening means for said valves each including a cam follower, a hollow cam drum of relatively large diameter supported for rotary valve actuating movement and for axial timing adjustment movement relative to said followers, said drum having raised cam areas on the outer surface thereof adapted to actuate said followers at properly timed intervals, means for rotating said drum in synchronism with said drive shaft, a fluid pressure cylinder disposed within said drum, a piston within said cylinder, means operatively connecting said piston and said drum, and means for supplying fluid pressure to and exhausting it from said cylinder at will.

5. A prime mover comprising, in combination, a multicylinder uniflow steam engine mounted adjacent to and in driving relationship with a drive shaft, a valve controlling the intake for each cylinder, opening means for said valves each including a cam follower, a cam drum driven from said shaft and having raised cam surfaces thereon adapted to move said cam followers and control the opening of the valves, said cam surfaces having lifting faces parallel to the axis of the drum, the surfaces tapering obliquely rearwardly from said lifting faces to provide varying lengths of cut-off depending upon the axially shifted position of the drum with respect to the followers, and fluid pressure controlled means at each end of the drum and operating in alternation to shift the drum axially, and manual operable means for supplying fluid pressure selectively to said fluid pressure controlled means at opposite ends of the drum and simultaneously venting the pressure fluid from the ones not being supplied.

6. In a prime mover, as set forth in claim 5, a plurality of such engines, each having one of said valve controlling cam drums and fluid pressure controls, and in which manifolds of great capacity serve to connect the supplying means with the ends of said drums, whereby the response of said drums may be immediate and the controlling pressure quickly equalized.

7. A prime mover comprising, in combination, a multicylinder uniflow steam engine mounted adjacent to and in driving relationship with a drive shaft, a poppet valve controlling the intake of each cylinder, opening means for said valves each including a cam follower, a hollow cam drum of relatively large diameter supported for rotary valve actuating movement and for axial timing adjustment movement relative to said followers, said drum having raised cam areas on the outer surface thereof adapted to actuate said followers at properly timed intervals, gear teeth on said drum peripherally and centrally thereof, the cam areas being disposed upon either side of said gear teeth, a gear on said drive shaft meshing continually with the gear teeth on the drum regardless of the shifted position of the drum, whereby said drum is rotated in synchronism with said drive shaft, a transverse web extending across said drum centrally thereof and within the plane of said gear teeth, a tubular stem extending axially in each direction from said web and slidingly mounted on a fixed supporting shaft, fluid pressure actuated means operatively connected with each of said stems for shifting the drum to vary the valve timing.

8. A prime mover comprising, in combination, a multicylinder uniflow steam engine mounted adjacent to and in driving relationship with a drive shaft, a poppet valve controlling the intake of each cylinder, opening means for said valves each including a cam follower, a hollow cam drum of relatively large diameter supported for rotary valve actuating movement and for axial timing adjustment movement relative to said followers, said drum having raised cam areas on the outer surface thereof adapted to actuate said followers at properly timed intervals, means for rotating said drum in synchronism with said drive shaft, a non-rotating, fluid pressure actuated, axially shiftable transmission member housed within said hollow drum and abutting a portion rigid with the drum for effecting said axial timing adjustment movement of the latter, and a fluid pressure servo-motor operatively connected with said transmission member, and manually operated means for controlling said servo-member.

9. A prime mover comprising, in combination, a multicylinder uniflow steam engine mounted adjacent to and in driving relationship with a drive shaft, a poppet valve controlling the intake of each cylinder, opening means for said valves each including a cam follower, a hollow cam drum of relatively large diameter supported for rotary valve actuating movement and for axial timing adjustment movement relative to said followers, said drum having raised cam areas on the outer surface thereof adapted to actuate said followers at properly timed intervals, gear teeth on said drum peripherally and centrally thereof, the cam areas being disposed upon both sides of said gear teeth, a gear on said drive shaft meshing continually with the gear teeth on the drum regardless of the shifted position of the drum, whereby said drum is rotated in synchronism with said drive shaft, a non-rotating, fluid pressure actuated, axially shiftable transmission member housed within said hollow drum at each end thereof and abutting portions rigid with the drum effecting said axial timing adjustment movements of the latter, and fluid pressure means operatively connected with the transmission member at both ends of said drum for moving said transmission members at will.

JOHN A. McGREW.

REFERENCES CITED

The following references are of record in the file of this patent:

UNITED STATES PATENTS

| Number | Name | Date |
|---|---|---|
| 240,792 | Wadsworth | Apr. 26, 1881 |
| 876,423 | Adams et al. | Jan. 14, 1908 |
| 1,011,516 | Stappen | Dec. 12, 1911 |
| 1,028,632 | Stumpf | June 4, 1912 |
| 1,043,479 | Stumpf | Nov. 5, 1912 |
| 1,045,630 | Stumpf | Nov. 26, 1912 |
| 1,112,489 | Stevens | Oct. 6, 1914 |
| 1,478,843 | Turnwald | Dec. 25, 1923 |
| 1,698,588 | Hagman | Jan. 8, 1929 |
| 1,734,419 | Chitty | Nov. 5, 1929 |
| 1,983,539 | Engstrom et al. | Dec. 11, 1934 |
| 1,990,899 | Frazier | Feb. 12, 1935 |
| 2,060,705 | Velo | Nov. 10, 1936 |
| 2,214,424 | McGrew | Sept. 10, 1940 |
| 2,292,728 | Wälti | Aug. 11, 1942 |

FOREIGN PATENTS

| Number | Country | Date |
|---|---|---|
| 25,313 | Great Britain | Nov. 21, 1904 |
| 173,769 | Great Britain | Mar. 29, 1923 |
| 488,893 | Great Britain | July 15, 1938 |
| 208,702 | Germany | Apr. 5, 1909 |